(12) United States Patent
Murai et al.

(10) Patent No.: US 7,598,012 B2
(45) Date of Patent: *Oct. 6, 2009

(54) COLORING COMPOUND AND RECORDING MATERIAL USING THE SAME

(75) Inventors: Yasuaki Murai, Kawasaki (JP); Masakazu Matsumoto, Yokohama (JP); Shoji Umehara, Moriya (JP); Takeshi Miyazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 491 days.

This patent is subject to a terminal disclaimer.

(21) Appl. No.: 10/548,372

(22) PCT Filed: May 14, 2004

(86) PCT No.: PCT/JP2004/006916

§ 371 (c)(1),
(2), (4) Date: Sep. 7, 2005

(87) PCT Pub. No.: WO2004/101688

PCT Pub. Date: Nov. 25, 2004

(65) Prior Publication Data

US 2006/0183046 A1    Aug. 17, 2006

(30) Foreign Application Priority Data

May 16, 2003    (JP) .............................. 2003-139436

(51) Int. Cl.
C07D 211/46    (2006.01)
G03G 9/09    (2006.01)
(52) U.S. Cl. .............................. 430/108.21; 430/108.5; 546/216; 347/100
(58) Field of Classification Search .................. 546/216; 347/100; 430/108.21, 108.5
See application file for complete search history.

(56) References Cited

U.S. PATENT DOCUMENTS

| | | | |
|---|---|---|---|
| 6,458,195 B1 | 10/2002 | Stoffel et al. .............. | 106/31.51 |
| 6,508,872 B2 | 1/2003 | Nguyen et al. ........... | 106/41.47 |
| 6,921,433 B2 | 7/2005 | Kuribayashi et al. ........ | 106/499 |
| 6,964,700 B2 | 11/2005 | Uji et al. .................. | 106/31.28 |
| 7,083,667 B2 | 8/2006 | Murai et al. ............. | 106/31.43 |
| 7,264,910 B2 | 9/2007 | Toyoda et al. .......... | 430/108.21 |
| 2002/0139281 A1 | 10/2002 | Stoffel et al. ............. | 106/31.51 |
| 2002/0174802 A1 | 11/2002 | Nguyen et al. ........... | 106/31.47 |
| 2003/0116059 A1 | 6/2003 | Nguyen et al. ........... | 106/31.47 |
| 2005/0188894 A1 | 9/2005 | Yamagishi et al. ....... | 106/31.43 |
| 2006/0183046 A1 | 8/2006 | Murai et al. ............. | 430/108.2 |

FOREIGN PATENT DOCUMENTS

| | | |
|---|---|---|
| JP | 3-276161 | 12/1991 |
| JP | 7-209912 | 8/1995 |
| JP | 8-123085 | 5/1996 |
| JP | 11-170686 | 6/1999 |
| JP | 2000-303009 | 10/2000 |
| JP | 2002-19273 | 1/2002 |
| JP | 2002-212237 | 7/2002 |
| JP | 2002-219857 | 8/2002 |
| JP | 2002-249677 | 9/2002 |
| JP | 2002-285022 | 10/2002 |
| JP | 2002-302622 | 10/2002 |
| JP | 2002-317135 | 10/2002 |
| JP | 2002-348512 | 12/2002 |
| JP | 2003-34758 | 2/2003 |
| JP | 2003-48369 | 2/2003 |
| WO | WO 89/10384 | 11/1989 |
| WO | WO 2004/026964 A1 | 4/2004 |

*Primary Examiner*—Brenda L Coleman
*Assistant Examiner*—Susanna Moore
(74) *Attorney, Agent, or Firm*—Fitzpatrick, Cella, Harper & Scinto

(57) ABSTRACT

Disclosed herein are a coloring compound represented by the general formula:

$$A\text{-}L_1\text{-}X\text{-}L_2\text{-}B \quad (1)$$

wherein A is a coloring moiety, B is a stabilizing moiety having fading-preventing ability, $L_1$ and $L_2$ are linkers for linking A, X and B by covalent bonding and denote, independently of each other, any group of —O—, —CO—, —OCO—, —NR$_1$— (in which $R_1$ is a group selected from hydrogen, alkyl, aryl and aralkyl groups), —NHCO—, —NHCOO—, —NHCONH—, —NHCSNH—, —SO—, —SO$_2$—, —SO$_2$NH—, —S—, —SS— and —CH$_2$—, with the proviso that $L_1$ and $L_2$ are not —CH$_2$— at the same time, and X is a spacer moiety and denotes any group of an alkylene group having 1 to 10 carbon atoms, an alkenylene group having 2 to 10 carbon atoms, an alkynylene group having 2 to 10 carbon atoms, an alkoxyalkylene group having 1 to 10 carbon atoms, a cycloalkylene group having 5 to 7 carbon atoms, an arylene group having 6 to 10 carbon atoms and a pyranose type saccharide having 1 to 7 saccharide units, and a recording material using the coloring compound as a coloring material.

4 Claims, 2 Drawing Sheets

COLORING COMPOUND AND RECORDING MATERIAL USING THE SAME

BACKGROUND OF THE INVENTION

1. Field of the Invention

The present invention relates to a coloring compound having high brightness and excellent storage stability, and a recording material using it as a coloring material.

2. Related Background Art

With the change of life-style by the progress of technology, coloring matter has come to be used not only for dying materials such as fibers, plastics, and leather heretofore, but also in various industrial fields making good use of its property of recording or displaying information. In particular, with the rapid spread of personal computers in recent years, hard copy technology typified by ink-jet and electrophotography has been advanced for recording characters and image information outputted from the computers.

Ink-jet printing technology has come to progress, in image quality, up to exceeding a silver halide photograph. However, stability in images with time may yet be insufficient in some cases. A coloring material used for an ink-jet ink is a dye or pigment. Although the former can obtain high-resolution quality of image, it is inferior in storage stability. While the weather-fastness of the latter is relatively good, there is a problem that the color reproduction range is narrow and inferior to dye ink in respect of quality of image.

The fading of a coloring material is considered to be induced by light, humidity, and active gasses in the environment, such as ozone, and there is a demand for development of a novel coloring material having high weather fastness.

A method wherein an ultraviolet absorbent, light stabilizer, antioxidant, or the like is used as an additive in an ink is made public as means for improving the weather fastness of an ink-jet ink (see Japanese Patent Application Laid-Open Nos. H11-170686, 2002-317135 and 2002-348512). Also, a technique as to a method for improving weather fastness by improving paper that is a recording medium is made public (see Japanese Patent Application Laid-Open Nos. 2002-19273, 2002-212237, 2002-219857 and 2003-48369). In any technique, the improvement in weather fastness is observed. However, in some cases, its effect may not be said to be sufficient. It is also attempted to improve the weather resistance of a dye molecule itself (see, for example, Japanese Patent Application Laid-Open Nos. 2000-303009, 2002-249677 and 2003-34758 for cyan-dyes, Japanese Patent Application Laid-Open No. 2002-302622 for magenta dyes, and Japanese Patent Application Laid-Open No. 2002-285022 for yellow dyes).

On the other hand, as properties required of a coloring material for a developer for electrophotography, i.e., a toner, there are mentioned absorption characteristics that can obtain a wide color reproduction range, optical transparency on an OHP sheet, and environmental stability. A toner made from a pigment as a coloring material is usually poor in transparency due to contribution of light scattering by coherent pigment particles, though it is excellent in stability of color tone with time. Toners using a dye as a coloring material are made public (see Japanese Patent Application Laid-Open Nos. H3-276161, H7-209912 and H8-123085). These toners may not be good in weather fastness in some cases, though they are good in transparency.

As described above, various proposals have been made. However, any coloring material having good hue and brightness as well as sufficient weather fastness may not yet be obtained in many cases.

SUMMARY OF THE INVENTION

An object of the present invention is to provide a coloring compound, which can be used as a coloring material for hard copy typified by ink-jet and electrophotography and for coloring of printing inks, paints, writing inks, color filter, etc., and is bright in hue and excellent in weather fastness.

Another object of the present invention is to provide a recording material using the above coloring compound as a coloring material, such as an ink or toner.

The above objects can be achieved by the present invention described below.

According to the present invention, there is thus provided a coloring compound represented by the general formula:

$$A\text{-}L_1\text{-}X\text{-}L_2\text{-}B \qquad (1)$$

wherein A is a coloring moiety, B is a stabilizing moiety having fading-preventing ability, $L_1$ and $L_2$ are linkers for linking A, X and B by covalent bonding and denote, independently of each other, any group of —O—, —CO—, —OCO—, —NR$_1$— (in which R$_1$ is a group selected from hydrogen, and alkyl, aryl and aralkyl groups), —NHCO—, —NHCOO—, —NHCONH—, —NHCSNH—, —SO—, —SO$_2$—, —SO$_2$NH—, —S—, —SS— and —CH$_2$—, with the proviso that $L_1$ and $L_2$ are not —CH$_2$— at the same time, and X is a spacer moiety and denotes any group of an alkylene group having 1 to 10 carbon atoms, an alkenylene group having 2 to 10 carbon atoms, an alkynylene group having 2 to 10 carbon atoms, an alkoxyalkylene group having 1 to 10 carbon atoms, a cycloalkylene group having 5 to 7 carbon atoms, an arylene group having 6 to 10 carbon atoms and a pyranose type saccharide having 1 to 7 saccharide units.

According to the present invention, there is also provided an ink-jet ink, comprising the coloring compound described above.

According to the present invention, there is further provided a toner for electrophotography, comprising the coloring compound described above.

DESCRIPTION OF THE PREFERRED EMBODIMENTS

Figure 1:
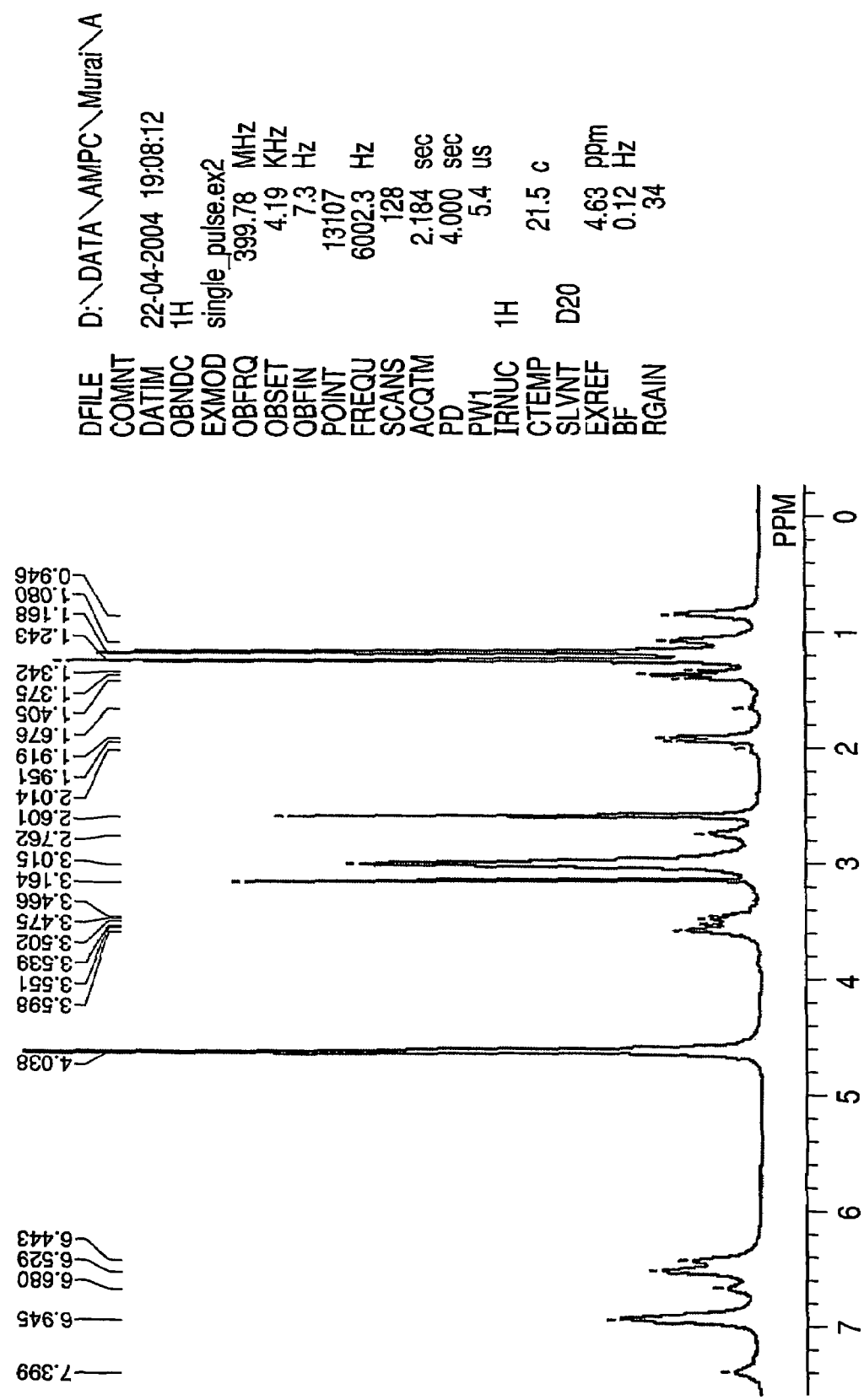
FIG. 1 illustrates a $^1$H-NMR spectrum of a coloring compound (13) according to the present invention.
Figure 2:
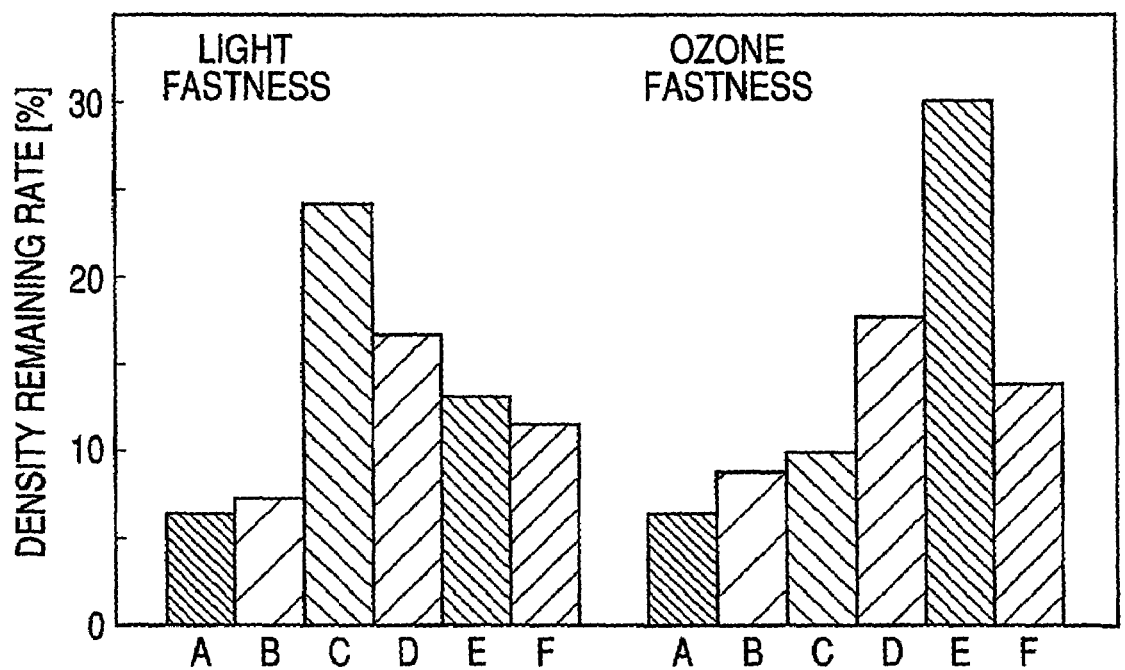
FIG. 2 illustrates a bar chart indicating remaining rates (%) of image densities after light fastness and ozone fastness tests.

In the present invention, as described above, A is a coloring moiety and mainly contributes to coloring ability and brightness, B is a stabilizing moiety and has fading-preventing ability, $L_1$ and $L_2$ link A, X and B by covalent bonding, X is a spacer moiety, and -$L_1$-X-$L_2$- contributes to a spatial distance between the coloring moiety A and the stabilizing portion B.

As A in the general formula (1), is preferable a chromophore having a triphenylmethane structure or xanthene structure having a substituent group for being bonded to $L_1$. Specific preferable examples thereof include those represented by the following general formulae (2) and (3) though not limited thereto. Among these, those represented by the general formula (2) are particularly preferable.

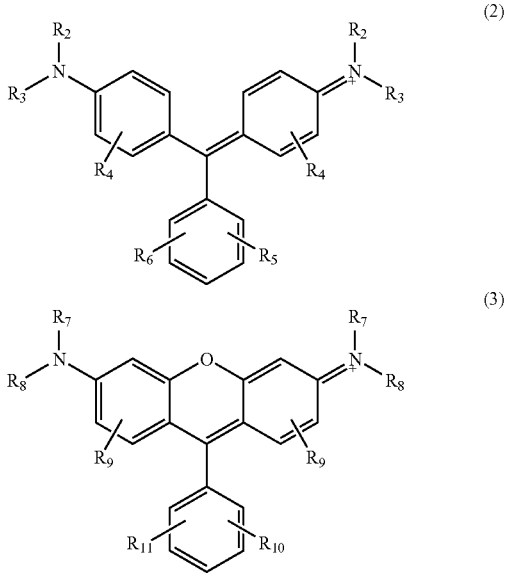

In the general formula (2), $R_2$ and $R_3$ are, independently of each other, hydrogen, a substituted or unsubstituted alkyl group having 1 to 5 carbon atoms, a substituted or unsubstituted aryl group or a substituted or unsubstituted aralkyl group, $R_4$ is hydrogen, halogen, or a substituted or unsubstituted alkyl or alkoxy group having 1 to 5 carbon atoms, and $R_5$ and $R_6$ are, independently of each other, hydrogen, halogen, or a substituted or unsubstituted alkyl, alkoxy, hydroxyl, carboxylate or sulfonate group.

Examples of the alkyl groups having 1 to 5 carbon atoms in $R_2$ and $R_3$ include methyl, ethyl, isopropyl, n-propyl, sec-butyl, tert-butyl, n-butyl and pentyl groups. Examples of the substituent group, which may be possessed by these alkyl groups, include hydroxyl, sulfonate, carboxylate, cyano, methoxy and ethoxy groups. Examples of the aryl groups in $R_2$ and $R_3$ include phenyl and naphthyl groups. Examples of the aralkyl groups include benzyl and phenethyl groups. Examples of the substituent group, which may be possessed by these aryl or aralkyl groups, include alkyl groups such as methyl, ethyl and propyl groups, halogen atoms, a sulfonate group, and alkoxy groups such as methoxy, ethoxy, propoxy and butoxy groups. Hydrogen, an alkyl group having 1 to 5 carbon atoms, and a phenyl or benzyl group having an alkyl, alkoxy or sulfonate group as a substituent group are preferable as $R_2$ and $R_3$, with an alkyl group having 1 to 5 carbon atoms being more preferable. Among these, a methyl group is particularly preferable.

Examples of the alkyl group having 1 to 5 carbon atoms in $R_4$ include methyl-, ethyl, isopropyl, n-propyl, sec-butyl, tert-butyl, n-butyl and pentyl groups. Examples of the substituent group, which may be possessed by these alkyl groups, include the same groups as those of the alkyl groups having 1 to 5 carbon atoms in $R_2$ and $R_3$. Examples of the alkoxy groups in $R_4$ include methoxy, ethoxy, propoxy and butoxy groups. Hydrogen, an alkyl group having 1 to 5 carbon atoms, and halogen are preferable as $R_4$, with hydrogen being more preferable. A substituting position of $R_4$ is preferably a meta-position to the substituted amino group.

Examples of the alkyl groups in $R_5$ and $R_6$ include methyl, ethyl, isopropyl, n-propyl, sec-butyl, tert-butyl, n-butyl and pentyl groups. Examples of the substituent group, which may be possessed by these alkyl groups, include the same groups as those of the alkyl groups having 1 to 5 carbon atoms in $R_2$ and $R_3$. Examples of the alkoxy groups in $R_5$ and $R_6$ include methoxy, ethoxy, propoxy and butoxy groups. Hydrogen, an alkyl group having 1 to 5 carbon atoms, and halogen are preferable as $R_5$ and $R_6$, with hydrogen being more preferable.

In the general formula (3), $R_7$ and $R_8$ are, independently of each other, hydrogen, a substituted or unsubstituted alkyl group having 1 to 5 carbon atoms, a substituted or unsubstituted aryl group or a substituted or unsubstituted aralkyl group, $R_9$ is hydrogen, halogen, or a substituted or unsubstituted alkyl or alkoxy group having 1 to 5 carbon atoms, and $R_{10}$ and $R_{11}$ are, independently of each other, hydrogen, halogen, or a substituted or unsubstituted alkyl, alkoxy, hydroxyl, carboxylate or sulfonate group.

Examples of the alkyl groups having 1 to 5 carbon atoms, aryl groups and aralkyl groups in $R_7$ and $R_8$ include the same groups as those exemplified in $R_2$ and $R_3$. As examples of the substituent groups, which may be possessed by the alkyl groups having 1 to 5 carbon atoms, aryl groups or aralkyl groups in $R_7$ and $R_8$, may also be mentioned the same groups as those exemplified in $R_2$ and $R_3$. Hydrogen, an alkyl group having 1 to 5 carbon atoms, and a phenyl or benzyl group having an alkyl, alkoxy or sulfonate group as a substituent group are preferable as $R_7$ and $R_8$, with a phenyl group having an alkyl group as a substituent group being more preferable.

Examples of the alkyl group having 1 to 5 carbon atoms in $R_9$ include methyl, ethyl, isopropyl, n-propyl, sec-butyl, tert-butyl, n-butyl and pentyl groups. Examples of the substituent group, which may be possessed by these alkyl groups, include the same groups as those of the alkyl groups having 1 to 5 carbon atoms in $R_2$ and $R_3$. Examples of the alkoxy groups in $R_9$ include methoxy, ethoxy, propoxy and butoxy groups. Hydrogen, an alkyl group having 1 to 5 carbon atoms, and halogen are preferable as $R_9$, with hydrogen being more preferable. A substituting position of $R_9$ is preferably a meta-position to the substituted amino group.

Examples of the alkyl groups in $R_{10}$ and $R_{11}$ include methyl, ethyl, isopropyl, n-propyl, sec-butyl, tert-butyl, n-butyl and pentyl groups. Examples of the substituent group, which may be possessed by these alkyl groups, include the same groups as those of the alkyl groups having 1 to 5 carbon atoms in $R_2$ and $R_3$. Examples of the alkoxy groups in $R_{10}$ and $R_{11}$ include methoxy, ethoxy, propoxy and butoxy groups. Hydrogen, an alkyl group having 1 to 5 carbon atoms, and halogen are preferable as $R_{10}$ and $R_{11}$, with hydrogen being more preferable.

In the general formula (2) or (3), $R_5$ and $R_6$, or $R_{10}$ and $R_{11}$ preferably have at least one substituent group for forming a covalent bond with $L_1$. Further, all of $R_5$, $R_6$, $R_{10}$ and $R_{11}$ are preferably hydrogen and covalently bonded to $L_1$ at an ortho-position to the carbon atom bonded to three benzene rings.

As $B_1$ is preferred a compound having a hindered amine structure, hindered phenol structure, benzophenone structure or benzotriazole structure having a substituent group for being bonded to $L_2$. Specific preferable examples thereof include those represented by the following general formulae (4) to (7) though not limited thereto. Among these, those represented by the general formula (4) are particularly preferred.

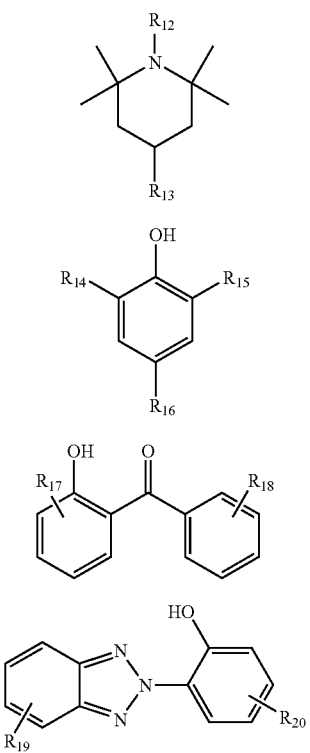

In the general formula (4), $R_{12}$ is hydrogen, or a hydroxyl, alkyl, alkenyl, alkynyl, aralkyl, aryl, acyl, sulfonyl, sulfinyl, alkoxy, aryloxy, acyloxy or oxy radical group, and $R_{13}$ is a hydroxyl, carboxyl or amino group. In this formula, $R_{13}$ is a substituent group for forming a covalent bond with $L_2$.

Examples of the alkyl group in $R_{12}$ include methyl, ethyl, isopropyl, n-propyl, sec-butyl, tert-butyl, n-butyl and pentyl groups. Examples of the alkenyl group include allyl and oleyl groups. Examples of the alkynyl group include an ethynyl group. Examples of the aralkyl group include benzyl and phenethyl groups. Examples of the aryl group include phenyl and naphthyl groups. Examples of the acyl group include acetyl, benzoyl and pentanoyl groups. Examples of the sulfonyl group include methanesulfonyl, benzenesulfonyl and toluenesulfonyl groups. Examples of the sulfinyl group include methanesulfinyl and benzenesulfinyl groups. Examples of the alkoxy group include methoxy, ethoxy, propoxy and butoxy groups. Examples of the aryloxy group include a phenoxy group. Examples of the acyloxy group include acetyloxy and beozoyloxy groups. Hydrogen, or an alkyl group having 1 to 5 carbon atoms, benzyl group or oxy radical group is preferable as $R_{13}$, and the alkyl group having 1 to 5 carbon atoms is more preferable taking the easiness of synthesis into consideration. In particular, a methyl group is preferable.

In the general formula (5), $R_{14}$ and $R_{15}$ are, independently of each other, hydrogen, or a methyl or tert-butyl group. $R_{16}$ is a hydroxyl, carboxyl, amino or sulfonyl group. In the general formula (5), $R_{16}$ is a substituent group for forming a covalent bond with $L_2$. A methyl or tert-butyl group is preferable as $R_{14}$ and $R_{15}$.

In the general formula (6), $R_{17}$ and $R_{18}$ are, independently of each other, hydrogen, halogen, or a hydroxyl, alkyl, alkoxy, carboxyl, acyl or acyloxy group. In the general formula (6), $R_{17}$ or $R_{18}$ is a substituent group for forming a covalent bond with $L_2$.

Examples of the alkyl group in $R_{17}$ or $R_{18}$ include methyl, ethyl, isopropyl, n-propyl, sec-butyl, tert-butyl, n-butyl and pentyl groups. Examples of the alkoxy group include methoxy, ethoxy, propoxy and butoxy groups. Examples of the acyl group include acetyl, benzoyl and pentanoyl groups. Examples of the acyloxy group include acetyloxy and beozoyloxy groups. Hydrogen, or a hydroxyl, methoxy, ethoxy or carboxyl group is preferable as $R_{17}$ and $R_{18}$.

In the general formula (7), $R_{19}$ and $R_{20}$ are, independently of each other, hydrogen, halogen, or a hydroxyl, alkyl, carboxyl, alkoxy, acyl, acyloxy or sulfonyl group. In the general formula (6), $R_{19}$ or $R_{20}$ is a substituent group for forming a covalent bond with $L_2$.

Examples of the alkyl group in $R_{19}$ or $R_{20}$ include methyl, ethyl, isopropyl, n-propyl, sec-butyl, tert-butyl, n-butyl and pentyl groups. Examples of the alkoxy group include methoxy, ethoxy, propoxy and butoxy groups. Examples of the acyl group include acetyl, benzoyl and pentanoyl groups. Examples of the acyloxy group include acetyloxy and beozoyloxy groups. Examples of the sulfonyl group include methanesulfonyl, benzenesulfonyl and toluenesulfonyl groups. Hydrogen, or a hydroxyl, carboxyl or sulfonyl group is preferable as $R_{19}$ and $R_{20}$.

$L_1$ and $L_2$ are, independently of each other, any group of —O—, —CO—, —OCO—, —NR$_1$— (in which $R_1$ is a group selected from hydrogen, and alkyl, aryl and aralkyl groups), —NHCO—, —NHCOO—, —NHCONH—, —NHCSNH—, —SO—, —SO$_2$—, —SO$_2$NH—, —S—, —SS— and —CH$_2$—, with the proviso that $L_1$ and $L_2$ are not —CH$_2$— at the same time. Among these, —O—, —OCO—, —NHCO— are —SO$_2$NH— are preferable, with —O— being more preferable. It is particularly preferable that both $L_1$ and $L_2$ are —O—.

Examples of the alkyl group in $R_1$ include methyl, ethyl, isopropyl, n-propyl, sec-butyl, tert-butyl, n-butyl and pentyl groups. Examples of the aryl group include phenyl and naphthyl groups. Examples of the aralkyl group include benzyl and phenethyl groups. The alkyl group in $R_1$ may be substituted by a hydroxyl, sulfonates, carboxylate, cyano, methoxy or ethoxy group, or the like. The aryl or aralkyl group in $R_1$ may also be substituted by an alkyl group such as a methyl, ethyl or propyl group, halogen, a sulfonates group, or an alkoxy group such as a methoxy, ethoxy, propoxy or butoxy group. Hydrogen, such an alkyl group as described above or a benzyl group is preferable as $R_1$.

X is an alkylene group having 1 to 10 carbon atoms, an alkenylene group having 2 to 10 carbon atoms, an alkynylene group having 2 to 10 carbon atoms, an alkoxyalkylene group having 1 to 10 carbon atoms, a cycloalkylene group having 5 to 7 carbon atoms, an arylene group having 6 to 10 carbon atoms and a pyranose type saccharide having 1 to 7 saccharide units.

Examples of the alkylene group having 1 to 10 carbon atoms in X include linear alkylene groups such as methylene, ethylene, n-propylene, n-butylene and pentylene groups, and branched alkylene groups such as isopropylene, sec-butylene and tert-butylene groups. Examples of the alkenylene group having 2 to 10 carbon atoms include vinylene, propenylene, butenylene and isobutenylene groups. Examples of the alkynylene group include an ethynylene group. Examples of the cycloalkylene group having 5 to 7 carbon atoms include cyclopentylene and cyclohexylene groups. Examples of the arylene group having 6 to 10 carbon atoms include phenylene and naphthylene groups. In the case where X is a saccharide, examples of the saccharide include monosaccharides selected from glucose, mannose, allose, aldose, gulose, idose, xylose, galactose, talose, psicose, fructose, sorbose, fucose and tagatose, and disaccharides comprising one or two selected from these monosaccharides as saccharide units. The bonding positions of the saccharide to $L_1$ and $L_2$ are preferably 1-position and 4-position, or 1-position and 6-position in the case of the monosaccharide, and 1-position and 1-position, 1-position and 4-position, or 1-position and 6-position in the case of the disaccharide.

A particularly preferable combination as the coloring compound represented by the general formula (1) is such that ① the coloring moiety A is that obtained by removing one hydrogen from the compound represented by the general formula (2), ② the stabilizing moiety B is that obtained by removing one hydrogen from the compound represented by the general formula (4), ③ the linkers $L_1$ and $L_2$ are both —O—, and ④ the spacer moiety X is that making a spatial distance between A and B short. Specifically, such X is preferably an alkylene group having 2 to 5 carbon atoms, a 1,2-phenylene group, a 1,3-phenylene group, a 1,4-glycosyl group or a 1,6-glycosyl group, with an n-butylene group being particularly preferable. When $R_2$ and $R_3$ in the compound represented by the general formula (2) are methyl groups, $R_4$ is hydrogen, $R_5$ and $R_6$ are hydrogen and covalently bonded to $L_1$ at an ortho-position to the carbon atom bonded to three benzene rings, $R_{13}$ in the compound represented by the general formula (4) is a methyl group, and $R_{13}$ is a substituent group for forming a covalent bond with $L_2$, such a coloring compound exhibits extremely excellent weather fastness.

When the coloring compound represented by the general formula (1) is, for example, a compound that A is a Malachite Green derivative of the general formula (2), B is a hindered amine derivative of the general formula (4), $L_1$ and $L_2$ are both —O—, and the moiety X is an n-butylene group, such a compound can be synthesized by a three-step reaction as described below. An example of the synthetic route is shown below.

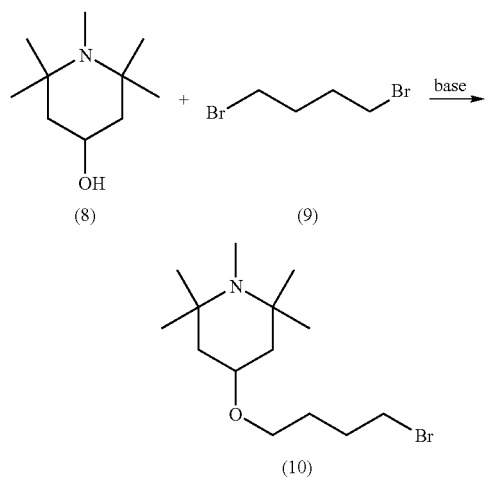

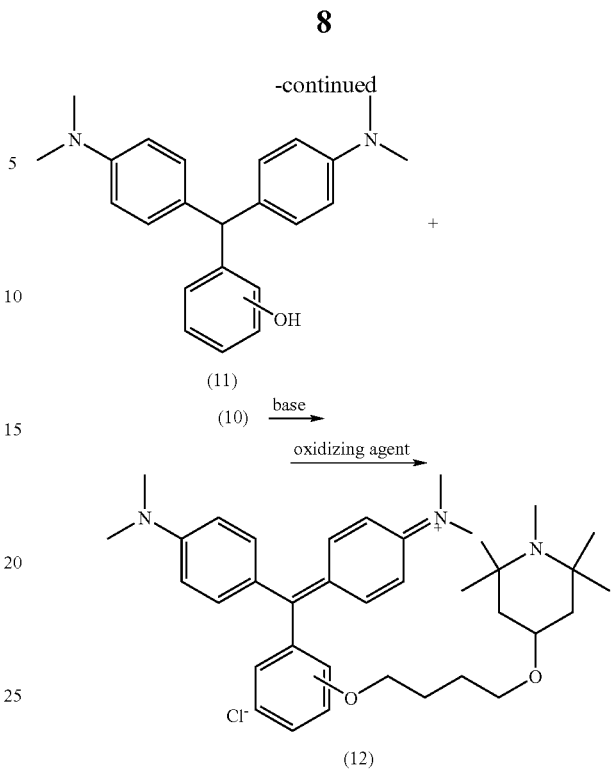

Specific examples of "base" used in the first step of the synthetic route include lithium hydroxide, sodium hydroxide, potassium hydroxide, sodium hydride, potassium t-butoxide and 1,8-diazabicyclo[5.4.0]-7-undecene (DBU). The amounts of the compounds of the general formulae (8) and (9) used are preferably from 1:1 to 1:5 in terms of a molar ratio. As a catalyst used in this reaction, may be used a tetrabutylammonium salt, crown ether or glyme ether.

Specific examples of "base" used in the second step of the synthetic route include lithium hydroxide, sodium hydroxide, potassium hydroxide, sodium hydride, potassium t-butoxide, potassium carbonate, sodium carbonate and 1,8-diazabicyclo[5.4.0]-7-undecene (DBU). The amounts of the compounds of the general formulae (10) and (11) are preferably from 1:1 to 3:1 in terms of a molar ratio. As a catalyst used in this reaction, may be used a tetrabutylammonium salt, crown ether or glyme ether.

The reactions of the first step and second step in the synthetic route are generally conducted in an organic solvent. Specifically, aliphatic hydrocarbon solvents such as hexane, octane, isooctane, decane and cyclohexane, aromatic solvents such as benzene, toluene, xylene and mesitylene, and aprotic solvents such as tetrahydrofuran, dioxane, diethyl ether and N,N-dimethylformamide may be used. The amount of the solvent used is 1 to 100 parts by mass, preferably 5 to 50 parts by mass per 1 part by mass of the compound of the general formula (8) or (11).

Specific examples of "oxidizing agent" used in the third step of the synthetic route include lead dioxide, manganese dioxide, potassium permanganate, p-chloranil and 2,3-dichloro-5,6-dicyano-1,4-benzoquinone.

The product obtained by these reactions is treated in accordance with a post treatment method for an ordinary organic synthetic reaction and then purified, thereby using it for the end application intended.

The product can be identified by NMR measurement, purity test by HPLC analysis [detection wavelength: 254 nm;

methanol/acetic acid buffer=85/15 (v/v)], mass spectrometry and ultraviolet-visible spectrum measurement.

The coloring compound according to the present invention can be used as a coloring material for coloring, preferably a recording material for image information. Specific examples of the recording material include materials for recording of the ink-jet system, which will be described in detail subsequently, and materials for developers of the electrophotographic system, printing inks, paints and writing inks, preferably recording materials used in the ink-jet system and recording materials for electrophotography, more preferably recording materials used in the ink-jet system. It may also be applied to a dying material for a color filter used in a liquid crystal display panel or the like. In the coloring compound according to the present invention, the kinds of the coloring moiety A, spacer moiety X, stabilizing moiety B and linking moieties $L_1$ and $L_2$, or the substituent group may be changed for the purpose of optimally adjusting its physical properties such as color tone, solubility and viscosity according to its purposes.

An ink-jet ink using the coloring matter according to the present invention will hereinafter be described. The coloring compound represented by the general formula (1) may be dissolved and/or dispersed in a lipophilic medium or hydrophilic medium, thereby preparing an ink. The hydrophilic medium is preferably used. In the ink according to the present invention, the coloring compound is preferably contained in an amount of 0.2 to 10 parts by mass per 100 parts by mass of the ink. In the ink-jet ink according to the present invention, another coloring matter such as a dye or pigment may also be used in combination with the coloring compound. When two or more kinds of coloring matter are used in combination, the total content of the coloring matter preferably falls within the above range. As the hydrophilic medium, may be used water, or a mixed medium of water and a water-soluble organic solvent. No particular limitation is imposed on the water-soluble organic solvent so far as it exhibits water-solubility, and examples thereof include alcohols, polyhydric alcohols, polyglycols, glycol ethers, nitrogen-containing polar solvents and sulfur-containing polar solvents. These water-soluble organic solvents may be preferably contained in a range from 1 to 40% by mass, more preferably from 3 to 30% by mass based on the total mass of the ink in view of the maintenance of moisture retention of the ink, improvement in solubility of the coloring material, effective penetration of the ink into recording paper, etc. The content of water in the ink is preferably within a range from 30 to 95% by mass for the purpose of providing such an ink that the solubility of the coloring matter, which is a coloring material, is good, it has a viscosity suitable for stable ink ejection, and clogging at an orifice is not caused.

No particular limitation is imposed on the pH of the ink used in the present invention so far as it satisfies the solubility of the coloring material. However, the pH is preferably within a range from 4.0 to 11.0 taking safety and the like into consideration.

When the ink used in the present invention is prepared, moisture-retaining solids such as urea, urea derivatives and trimethylolpropane may be used as a component for the ink for the purpose of maintaining the moisture retention of the ink. The content of the moisture-retaining solids, such as urea, urea derivatives and trimethylolpropane, in the ink is generally within a range preferably from 0.1 to 20.0% by mass, more preferably from 3.0 to 10.0% by mass based on the total mass of the ink. Besides the above components, various additives such as a surfactant, a pH adjustor, a rust preventive, a preservative, a mildew proofing agent, an anti-oxidant, a reduction-preventing agent, an evaporation accelerator, a chelating agent and a water-soluble polymer may be contained in the ink used in the present invention within limits not impairing the effects of the present invention, as needed. The ink according to the present invention is particularly suitably used in an ink-jet recording system of a type that ink droplets are ejected by the action of thermal energy. It goes without saying that the-ink may also be used in other ink-jet recording systems and as an ink for general writing utensils.

As a binder resin for color toners, into which the coloring compound according to the present invention is introduced, there may be used all binders generally used. Examples thereof include styrene resins, acrylic resins, styrene/acrylic resins and polyester resins. Inorganic fine powder or organic fine powder may be externally added to the toner for the purpose of improving flowability and controlling charging. Fine silica powder or fine titania powder, whose surface has been treated with an alkyl-group-containing coupling agent, is preferably used. Such powder preferably has a number average primary particle diameter of 10 to 500 nm, and is preferably contained in an amount of 0.1 to 20% by mass in the toner.

As a parting agent, there may be used all parting agents used heretofore. Specific examples thereof include olefin polymers such as low-molecular weight polypropylene, low-molecular weight polyethylene and ethylene-propylene copolymers, microcrystalline wax, carnauba wax, Sasol wax, and paraffin wax. These parting agents are preferably added in an amount of 1 to 5% by mass in the toner.

A charge control agent may be added as needed. It is preferably colorless from the viewpoint of coloring ability. Examples thereof include those having a quaternary ammonium salt structure, those having a calixarene structure and metal complexes of salicylic acid.

As a carrier, there may be used both a non-coated carrier composed only of particles of a magnetic material such as iron or ferrite and a resin-coated carrier obtained by coating the surfaces of magnetic material particles with a resin or the like. The average particle diameter of the carrier is preferably 30 to 150 mm in terms of volume average particle diameter.

No particular limitation is imposed on the image forming method to which the toner according to the present invention is applied. However, examples thereof include a method, in which a color image is repeatedly formed on a photosensitive member, and transfer is then conducted to form an image, and a method, in which an image formed on a photosensitive member is successively transferred to an intermediate transfer medium or the like to form a color image on the intermediate transfer medium, and the image is then transferred to a image-forming member such as paper to form a color image.

EXAMPLES

The present invention will hereinafter be described in more detail by the following Examples and Comparative Examples. However, the present invention is not limited to these examples.

To components of the following Ink Composition 1, 3 parts by mass of a comparative coloring compound (17) was added, and ion-exchanged water was additionally added to 100 parts by mass in total. This mixture was stirred, dissolved and mixed, and the resultant solution was filtered under pressure through a filter having a pore size of 0.20 µm to prepare Ink Solution A.

| (Ink Composition 1) | |
|---|---|
| Glycerol | 5.0 parts by mass |
| Urea | 5.0 parts by mass |
| Diethylene glycol | 10.0 parts by mass |
| Acetylenol (trade name; product of Kawaken Fine Chemicals Co., Ltd.) | 0.3 parts by mass |
| Ethanol | 5.0 parts by mass. |

Coloring compound: $A\text{-}L_1\text{-}X\text{-}L_2\text{-}B$

A:

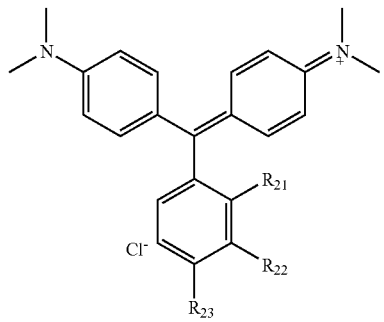

B:

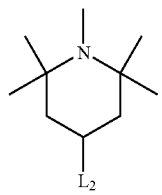

$L_1, L_2$:

X:

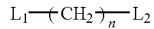

$L_1\text{—}(CH_2)_n\text{—}L_2$ n = 4 or 5

(13): $R_{21} = L_1(n = 4), R_{22}, R_{23} = H$
(14): $R_{22} = L_1(n = 4), R_{21}, R_{23} = H$
(15): $R_{23} = L_1(n = 4), R_{21}, R_{22} = H$
(16): $R_{22} = L_1(n = 5), R_{21}, R_{23} = H$
(17): $R_{21}, R_{22}, R_{23} = H$

To Ink Solution A, was added a hindered amine (8) in an equimolar amount to the compound (17) to prepare Ink Solution B.

With respect to the coloring compounds (13) to (16), Ink Solutions C to F were respectively prepared in such a manner that the molar concentration of the coloring matter in each ink solution becomes equal to Ink Solution A. Incidentally, the compounds (13) to (16) were identified by measuring an NMR spectrum by means of a JMN-ECA 400 (trade name; manufactured by JEOL Ltd.), conducting a purity test by HPLC by means of an LC-2010A (trade name; manufactured by Shimadzu Corporation), conducting mass spectrometry by means of a Microflex (trade name; manufactured by BRUKER DALTONICS) and measuring an ultraviolet-visible spectrum by means of a U-3310 type spectrophotometer (trade name; manufactured by Hitachi Ltd.) as described above. The analytical results of the compound (13) are shown below.

[Analytical results of Compound (13)]
$^1$H-NMR (400 MHz, $D_2O$, room temperature): δ=1.17(s, 6H), 1.24(s, 6H), 1.38(t, 2H), 1.98(d, 2H), 2.60(s, 3H), 3.47-3.55(m, 1H), 6.44-6.58(m, 5H), 6.68(m, 1H), 6.95(m, 5H), 7.40(m, 1H). Purity by HPLC=96.8 area %, retention time: 3.7 minutes. MALDI-TOF MS: m/z 605 ($M^+$: molecular ion peak). $\lambda_{max}$=624 nm (solvent: $H_2O$, at room temperature).

From the above results, it could be confirmed that the compound (13) was obtained.

The ink obtained above was charged into an ink cartridge of an ink-jet printer, BJF 930 (trade name; manufactured by Canon Inc.) to conduct printing on Professional Photo Paper (PR-101 paper, trade name; manufactured by Canon Inc.) to evaluate the ink as to light fastness and ozone fastness in accordance with the following respective methods.

<Light Fastness>

A solid image of 1-inch square was printed by the ink-jet printer to prepare a print. After the print was air-dried for 24 hours, its cyan image density $C_0$ was measured by means of a reflection densitometer, X-Rite 310TR (trade name; manufactured by X-rite Co.), and the image was then exposed to xenon light (illuminance: 765 w/m$^2$, temperature: 50° C.) for 25 hours using a Sun Tester XF-180CPS (trade name; manufactured by Shimadzu Corporation). The cyan image density Cf of the print after the exposure was measured to calculate out a remaining rate ($\{C_f/C_0\}\times100$ [%]) of the cyan density from the ratio between the reflection densities before and after the exposure to the xenon light.

<Ozone Fastness>

A print was air-dried for 24 hours after the printing in the same manner as in the evaluation as to the light fastness to measure an initial cyan image density $C_0$. Thereafter, the print was exposed for 2 hours to the atmosphere that an ozone concentration was 3 ppm, the temperature was 40° C., and the relative humidity was 55%, by an ozone fadeometer. The cyan image density $C_f$ of the print after the exposure was measured to calculate out a remaining rate ($\{C_f/C_0\}\times100$ [%]) of the cyan density from $C_0$ and $C_f$.

TABLE 1

Results of weathering test

| | | Remaining rate of density [%] | |
|---|---|---|---|
| Ink | Dye | Light fastness | Ozone fastness |
| Ink A | Comparative compound (17) | 6.3 | 6.3 |
| Ink B | Comparative compound (17) + (8) | 7.3 | 8.7 |
| Ink C | Coloring compound (13) | 24.1 | 9.8 |
| Ink D | Coloring compound (14) | 16.7 | 17.6 |
| Ink E | Coloring compound (15) | 13.2 | 30.0 |
| Ink F | Coloring compound (16) | 11.5 | 13.7 |

From the results of the tests shown in Table 1 and FIG. 1, it was observed that the coloring compounds (13) to (16) according to the present invention are higher in the remaining rate of the cyan density than the comparative compound (17), and so the light fastness and ozone fastness are improved. From the comparison of Ink Solution B with Ink Solutions C to F, it was found that a system that the stabilizing moiety has been introduced in a molecule like the present invention is higher in the fading-preventing effect than a system that a hindered amine has been simply added. From the comparison of the test results between Ink Solutions D and F, it was also found that the compound (14) shorter in the alkyl chain length has better weather resistance. This indicates that a spatial distance between the triphenylmethane structure and the hindered amine structure exerts an influence upon the weather resistance.

According to the present invention, as described above, (1) high-brightness coloring compounds having sufficient weather fastness to light, humidity and ozone gas are provided, (2) various recording materials excellent in environmental stability of color tone, such as colorants for ink-jet inks, developers for electrophotography, printing inks, paints, writing inks and color filters, are provided, and particularly (3) inks for ink-jet, by which image information high in weather fastness to light and active gasses in an environment, in particular, ozone gas can be recorded, are provided by using the coloring compounds according to the present invention.

What is claimed is:

1. A coloring compound represented by the formula:

$$A\text{-}L_1\text{-}X\text{-}L_2\text{-}B \qquad (1)$$

wherein A is a coloring moiety, B is a stabilizing moiety having fading-preventing ability, $L_1$ and $L_2$ are linkers for linking A, X and B by covalent bonding and denote —O—, and X is a spacer moiety and denotes an alkylene group having 1 to 10 carbon atoms, wherein the coloring moiety A has a triphenylmethane structure represented by the formula (2):

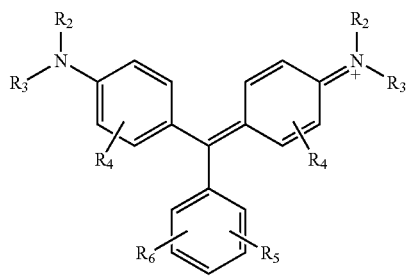

wherein $R_2$ and $R_3$ are, independently of each other, hydrogen, a substituted or unsubstituted alkyl group having 1 to 5 carbon atoms, a substituted or unsubstituted aryl group or a substituted or unsubstituted aralkyl group, $R_4$ is hydrogen, halogen, or a substituted or unsubstituted alkyl or alkoxy group having 1 to 5 carbon atoms, $R_5$ and $R_6$ are, independently of each other, hydrogen, halogen, or a substituted or unsubstituted alkyl, alkoxy, hydroxyl, carboxylate or sulfonate group, wherein in formula (2), one of $R_5$ and $R_6$ forms a covalent bond with $L_1$, wherein the stabilizing moiety B has a hindered amine structure represented by the formula (4):

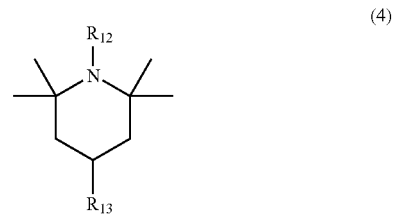

wherein $R_{12}$ is hydrogen, or a hydroxyl, alkyl, alkenyl, alkynyl, aralkyl, aryl, acyl, sulfonyl, sulfinyl, alkoxy, aryloxy, acyloxy or oxy radical group, $R_{13}$ is a hydroxyl, carboxyl or amino group, wherein in formula (4), $R_{13}$ forms a covalent bond with $L_2$, and wherein the compound of the general formula (2) has a counter anion.

2. An ink-jet ink, comprising:
the coloring compound according to claim 1; and
a lipophilic medium or hydrophilic medium.

3. A toner for electrophotography, comprising:
the coloring compound according to claim 1; and
a binder resin.

4. The coloring compound according to claim 1, wherein the counter anion of the compound of the general formula (2) is Cl$^-$.

* * * * *